Figure 1:
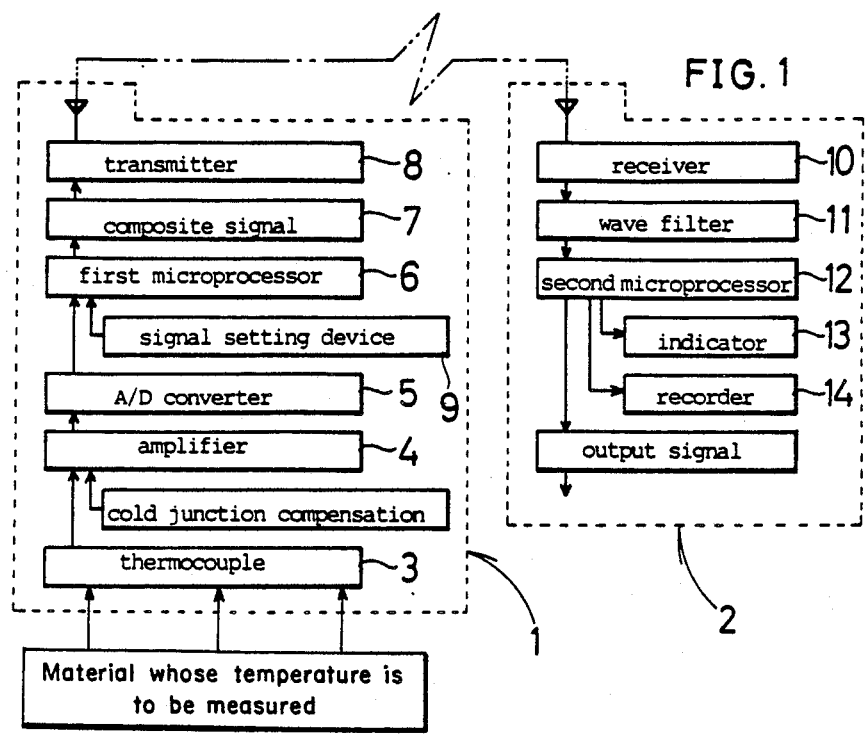

United States Patent [19]

Luttrell et al.

[11] Patent Number: 4,716,414
[45] Date of Patent: Dec. 29, 1987

[54] SUPER RESOLUTION IMAGING SYSTEM

[75] Inventors: Stephen P. Luttrell, Malvern Wells; Christopher J. Oliver, Malvern, both of England

[73] Assignee: The Secretary of State for Defence in Her Britannic Majesty's Government of the United Kingdom of Great Britain and Northern Ireland, London, England

[21] Appl. No.: 784,665

[22] Filed: Apr. 30, 1985

[30] Foreign Application Priority Data

May 10, 1984 [GB] United Kingdom ............... 8411916

[51] Int. Cl.$^4$ ............................................. G01S 13/89
[52] U.S. Cl. ..................................... 342/179; 367/7; 356/4.5
[58] Field of Search ............ 342/179; 367/7, 11; 73/602, 606; 350/3.66; 356/347, 349, 4.5; 256/330, 334

[56] References Cited

U.S. PATENT DOCUMENTS 3,953,822  4/1976  Vilkomerson ............... 342/179 X

OTHER PUBLICATIONS

Nakayama et al., "Imaging by Means of Multifrequency Hologram Matrix", Electronics and Communications in Japan, vol. 62-B, No. 12, 1979.

Primary Examiner—T. H. Tubbesing
Assistant Examiner—Gilberto Barrón, Jr.
Attorney, Agent, or Firm—William R. Hinds

[57] ABSTRACT

A super resolution imaging system employing coherent radiation comprises transmitting, receiving and processing means to provide complex amplitude image data. The image data is processed by a weight function generator to provide a weight function. The weight function has values at individual image pixels consisting of a background or clutter intensity term added to a pixel intensity dependent term. The latter term is non-zero for pixel intensities exceeding a threshold level well above background. A computer generates singular functions from the weight function and system impulse response, and employs the singular functions to decompose the image data and subsequent object reconstruction. This provides enhanced resolution compared to that available from the image data alone. An iteration controller employs the reconstructed object data to iterate resolution enhancement until no significant improvement is obtained.

8 Claims, 9 Drawing Figures

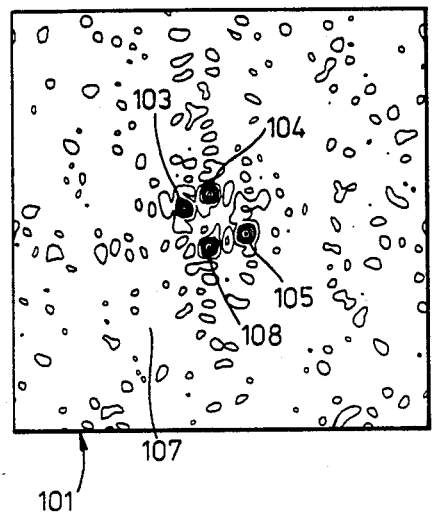
Fig.5.
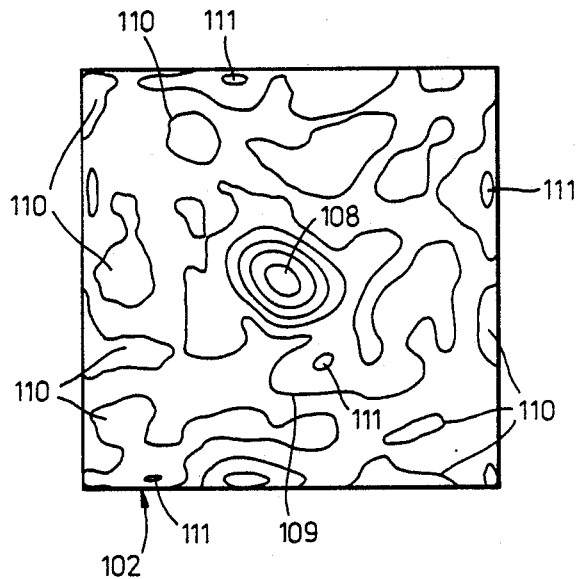

SUPER RESOLUTION IMAGING SYSTEM

This invention relates to a super resolution imaging system of the kind employing coherent radiation to illuminate a scene.

Super resolution or resolution enhancement in imaging systems is known, as set out for example in published United Kingdom Patent Application No 2, 113, 501A (Reference 1). This reference describes resolution enhancement in an optical microscope. The microscope comprises a laser illuminating a small area of an object plane and means for focussing light from the object plane on to an image plane containing a two dimensional array of detectors. Each detector output is processed to derive the complex amplitude and phase of the light or image element incident on it. A mathematical analysis of the image information is employed to reconstruct the illuminated object region. The analysis incorporates the constraints that the object illumination is zero outside a predetermined region, referred to as the support, and that a focussing device of known sparial impulse response or optical transfer function is employed to produce the image information. The known impulse response and support are analysed mathematically to produce related image and object space singular functions into which image data may be decomposed, and from which object data may be reconstructed. The process is analogous to Fourier spectral analysis. The net effect of this is that the object can be reconstructed from the image data with better resolution than that provided by the image data along. Resolution within the classical diffraction limit, the Rayleigh criterion, can be obtained. The mathematical analysis is discussed in detail by Bertero and Pike, Optica Acta, 1982, Vol 29, No 6, pp 727-746 (Reference 2).

Reference 1 is applicable to any imaging system, ie to optics, radar and sonar. It can be considered in broad terms as employing a single transmitter with a number of detectors, or alternatively as a transmitter with a movable or scanning detector. This corresponds to a bistatic radar system for example. However, in many important cases imaging systems employ a single coupled transmitter and receiver, as for example in monostatic radar equipment, sonar and laser range-finders or lidar. In radar and sonar, the transmitter and receiver are commonly the same device, ie a radar antenna or a sonar transducer array. In lidar, the laser transmitter and the detectors are coupled. In any of these cases, the transmitter/receiver combination may be scanned to provide the effect of equal numbers of transmitters and receivers, as occurs in air traffic control radar and synthetic aperture radar. In these and analogous optical and sonar equipments it would be expensive and undesirably complex to provide a plurality of detectors per transmitter, or to decouple the transmitter and receiver and scan the latter. Furthermore, Reference 1 provides no improvement in range information. It enhances resolution in directions orthogonal to the range dimension, ie the transmitter-target direction. In radar, sonar or lidar employed to determine target range, this would be an undesirable limitation.

It is an object of the present invention to provide an alternative form of imaging system adapted for resolution enhancement.

The present invention provides an imaging system having a given impulse response and including:

(1) an imaging device arranged to provide complex amplitude image data, (2) means for generating from image data a weight function appropriate to distinguish weak and strong image features, (3) means for reconstructing object data from a singular function decomposition of image data on the basis of singular functions derived from the weight function and system impulse response, and (4) means for generating an image from reconstructed object data.

The invention provides super resolution by generating singular functions from system impulse response and the weight function. The singular functions are employed in an image decomposition analogous to Fourier spectral analysis, and for subsequent object reconstruction. The weight function expresses the general expected form of the object giving rise to the image data, and is based on prior experience or knowledge of typical imaged objects. For example, an image containing a single intense diffraction maximum might in theory correspond to any assembly of scattering objects giving rise to constructive interference at the maximum and destructive interference elsewhere. In practice, it is overwhelmingly more probable that the maximum corresponds in position to a localised target distribution, and the weight function expresses this. The net effect of incorporating the weight in an image data analysis by singular function decomposition in accordance with the invention is that resolution may be enhanced over that obtainable according to the classical Rayleigh criterion.

The invention is applicable to any imaging system arranged to provide complex image data, such as radar, sonar or lidar. It is not restricted as regards the number of dimensions in which imaging is performed. Unlike References 1 and 2, in appropriate embodiments it is capable of enhancing range information.

The means for reconstructing object data preferably includes computing means arranged to:

(1) provide image and object space singular functions from the weight functions and system impulse response, (2) decompose image data into a linear combination of image space singular functions (3) convert the image space singular function combination into a corresponding object decomposition, and (4) reconstruct object data from its decomposition.

The computing means may also be arranged to omit noise-corrupted singular functions from the object reconstruction. Singular functions may be calculated from the weight function and system impulse response. Alternatively, generated weight functions may be matched with previously stored weight functions with corresponding pre-calculated singular functions. Provision of singular functions then merely involves selection.

In a preferred embodiment, the means for generating a weight function is arranged to assign each image pixel a respective weight value according to its intensity relative to nearby or local pixels. The weight function then consists of pixel weight as a function of pixel number. Individual pixel weights preferably vary in accordance with respective intensity if in excess of a threshold based on average local pixel intensity. Pixels with intensities not exceeding this threshold are preferably assigned a weight value based on local pixel intensities not exceeding the threshold.

The means for generating an image from reconstructed object data may include an envelope detector to provide amplitude modulus values and a visual display device.

The imaging system of the invention may include means for iterating weight function generation and reconstruction of object data. Such means would be operative to employ reconstructed object data instead of image data for weight function generation and iterative reconstruction of object data. It may preferably include means for terminating iteration when image enhancement reduces to an insignificant level.

Figure 2:
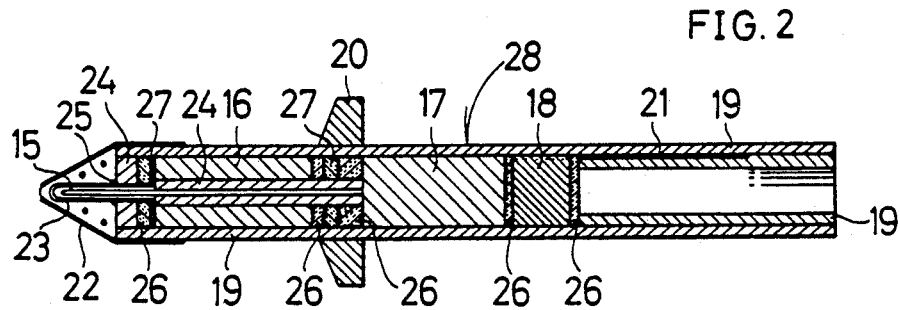
Figure 2:
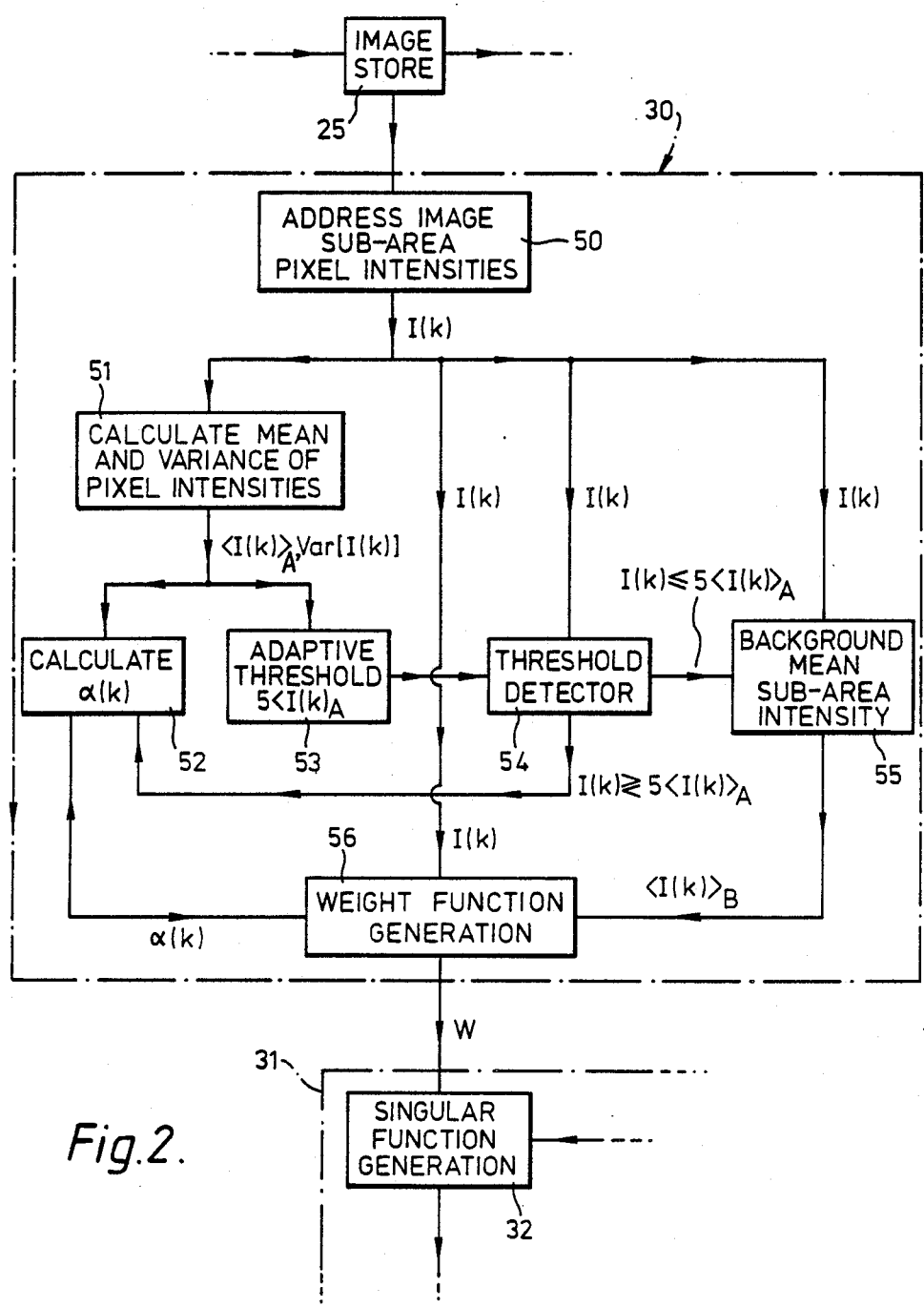
Figure 3:
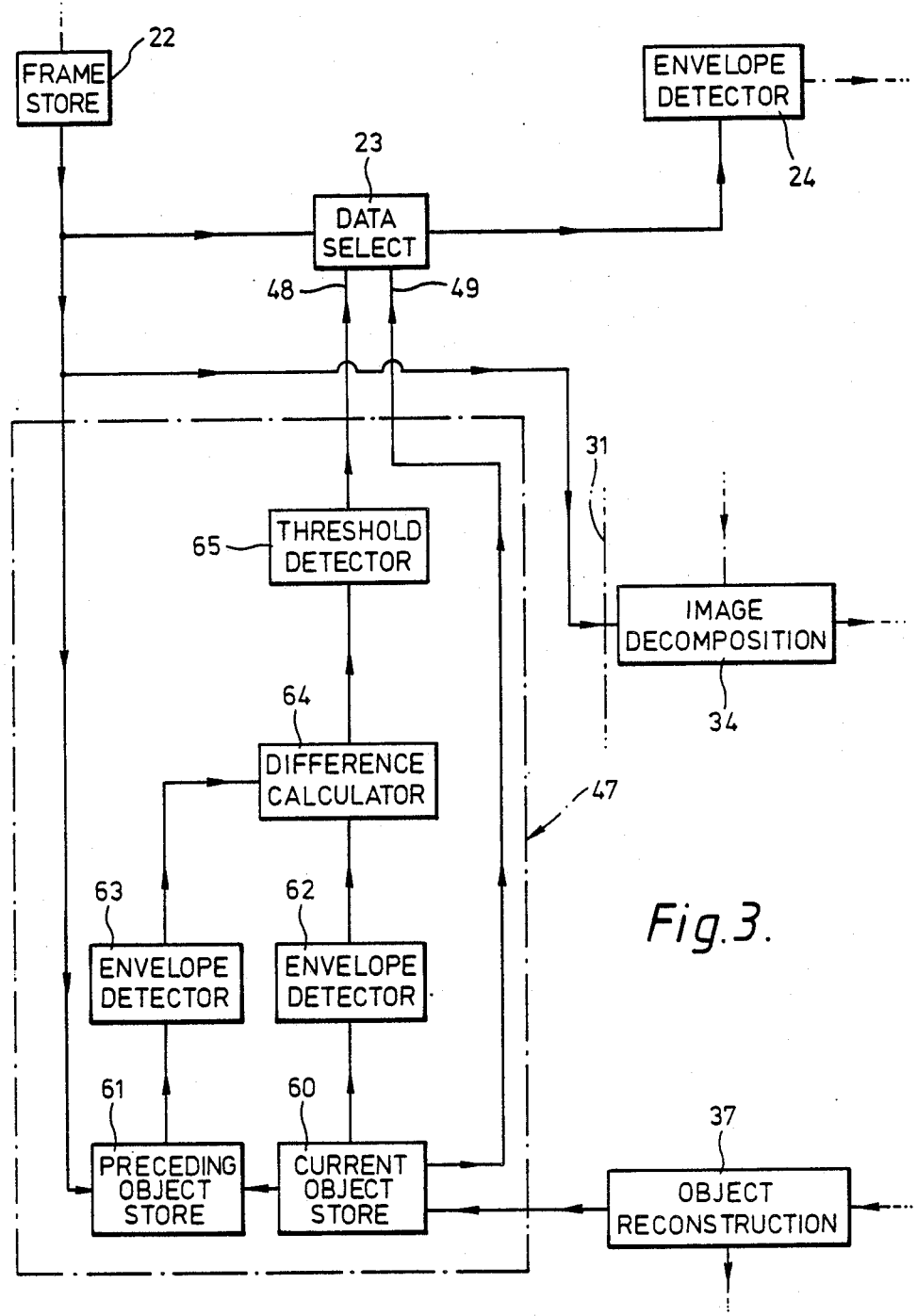
Figure 4:
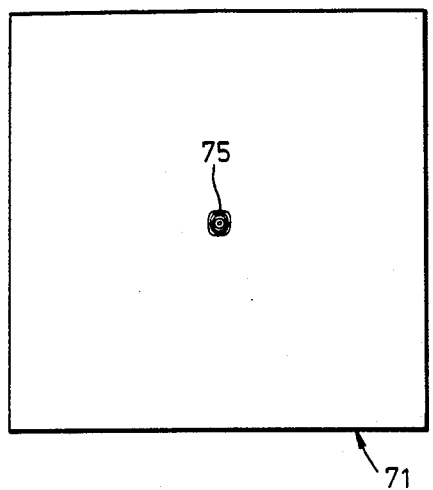
Figure 4:
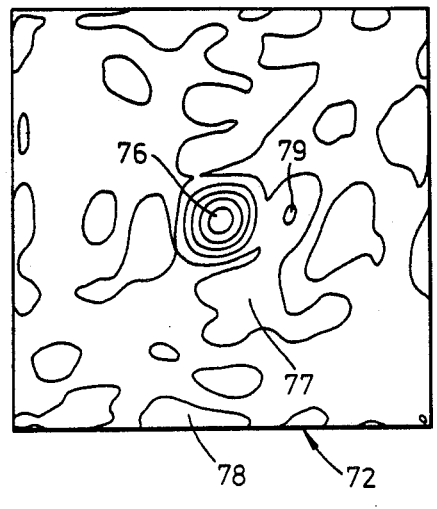
Figure 4:
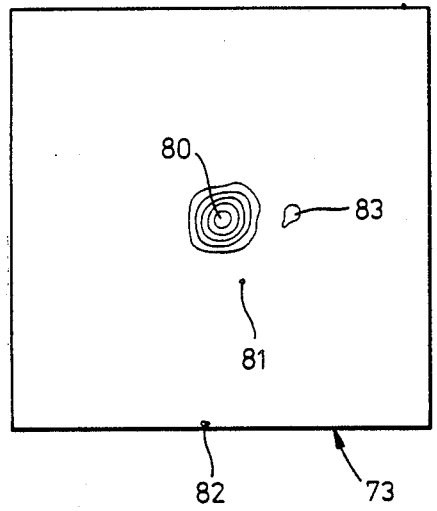
Figure 4:
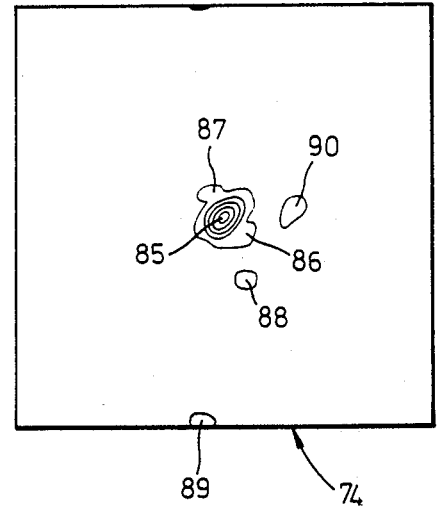
Figure 6:
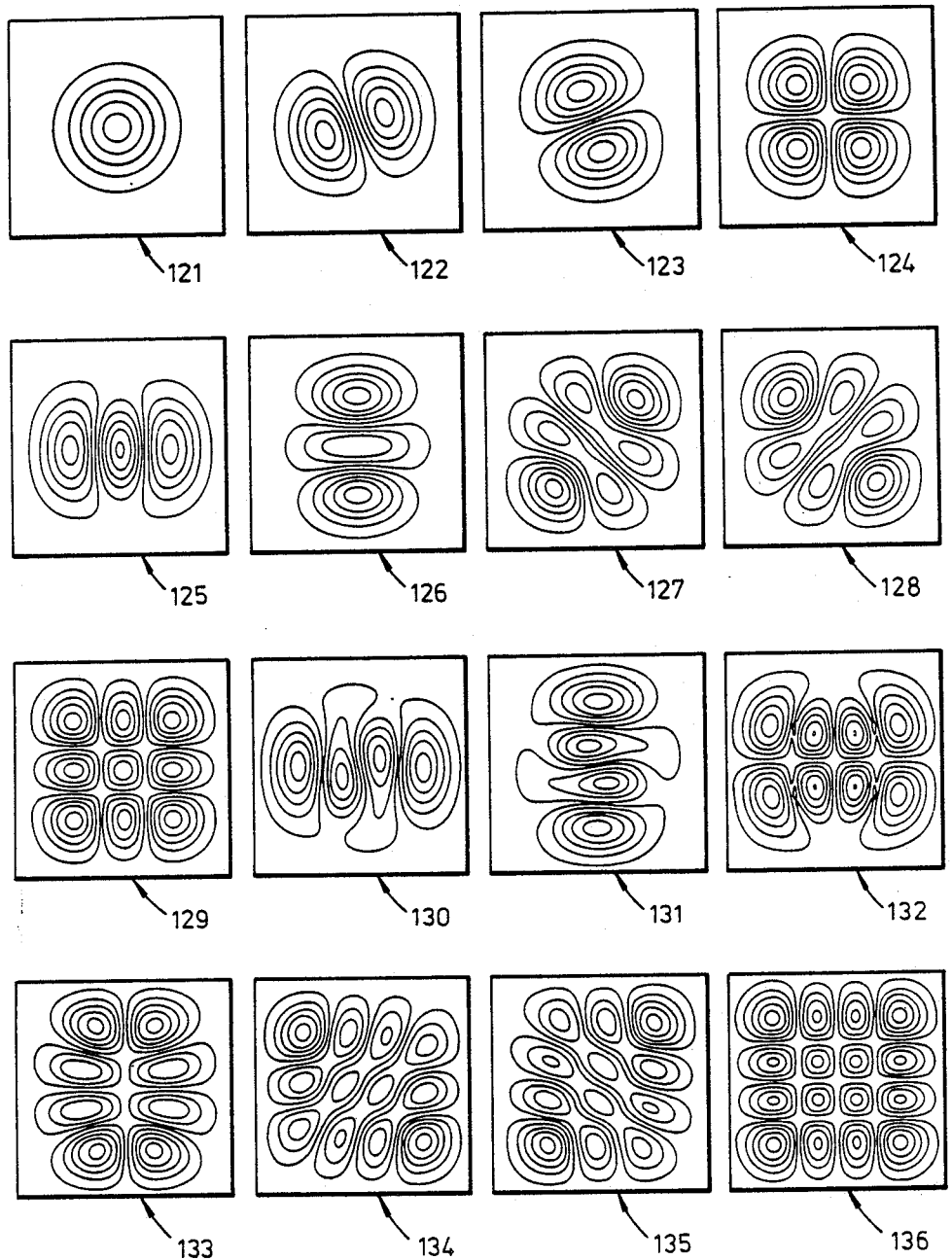
Figure 7:
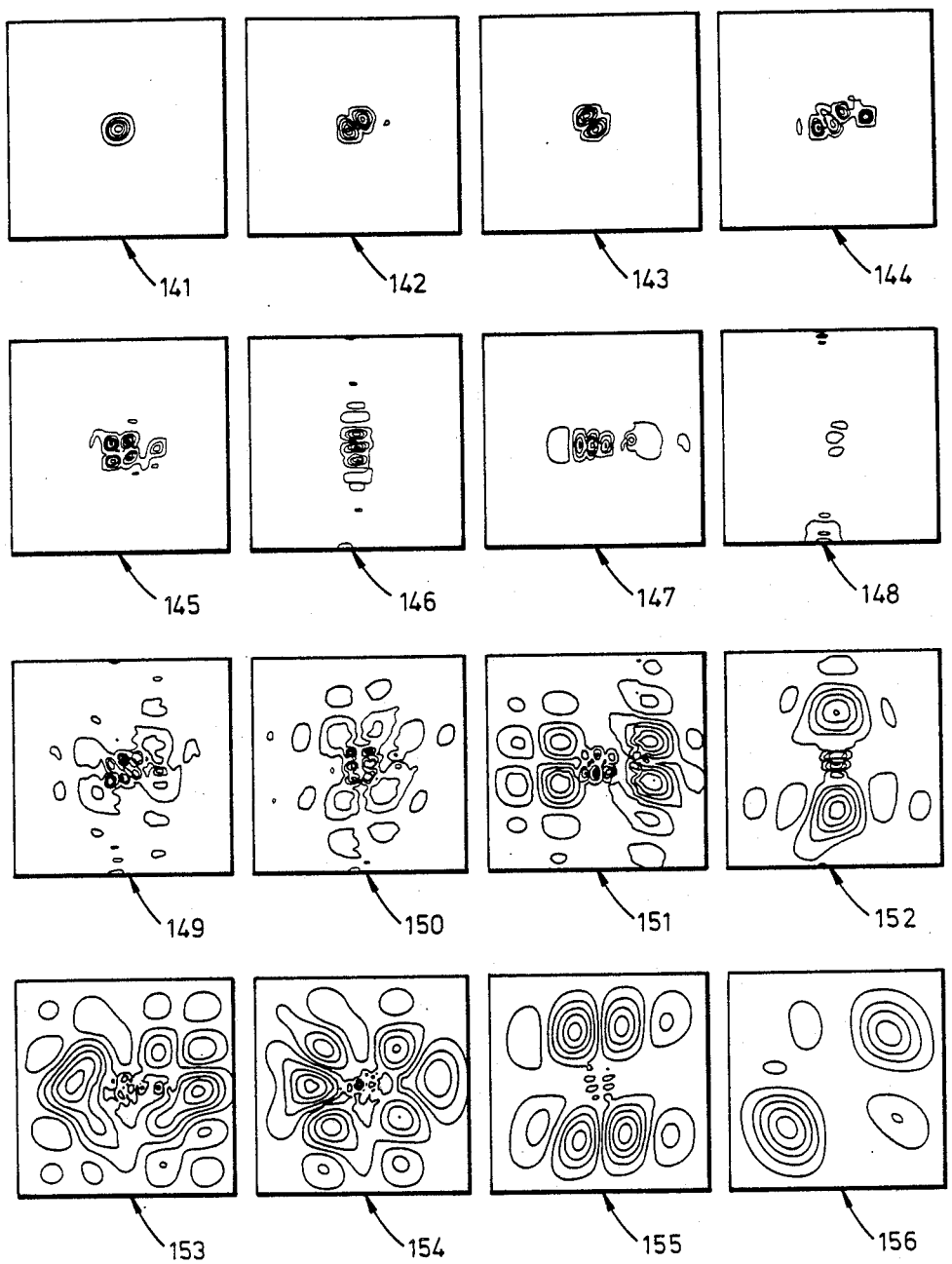
Figure 8:
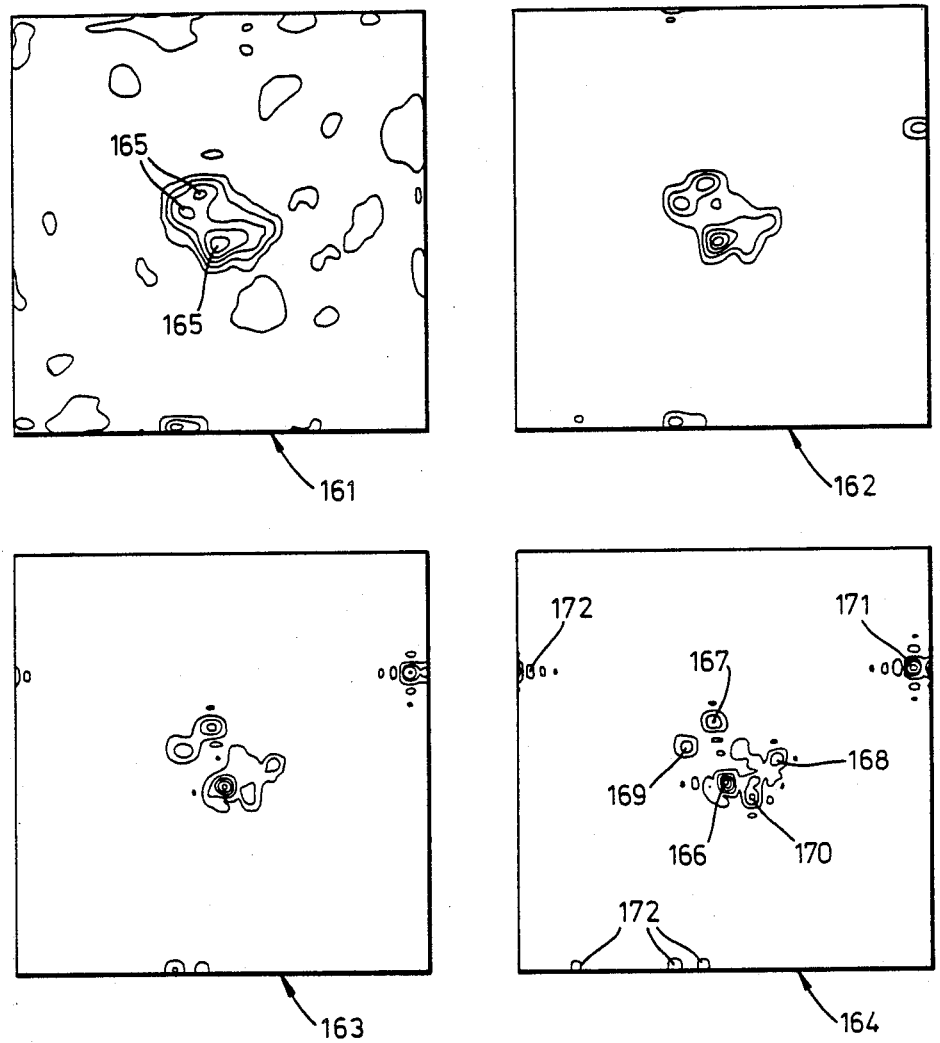
Figure 9:
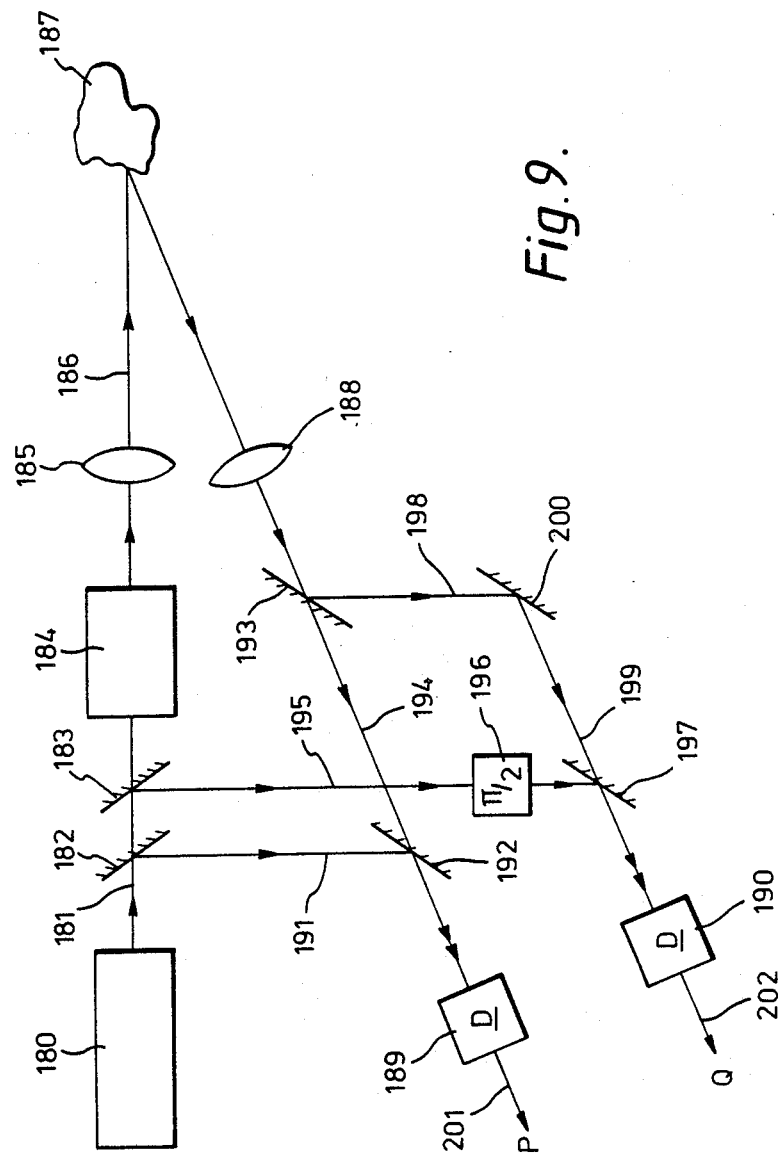

In order that the invention might be more fully understood, embodiments thereof will now be described with reference to the accompanying drawings, in which:

FIG. 1 is a schematic functional block diagram of an imaging system of the invention, FIGS. 2 and 3 are more detailed representations of a weight function generator and iteration controller respectively appearing in FIG. 1, both being schematic functional drawings, FIG. 4 provides two-dimensional contour drawings illustrating object reconstruction in accordance with the invention, FIG. 5 provides two-dimensional target and image contour drawings as produced in a conventional radar system, FIG. 6 illustrates unweighted singular functions, FIG. 7 illustrates weighted singular functions produced in accordance with the invention and employing FIG. 5 image data, FIG. 8 illustrates object reconstruction with the singular functions of FIG. 7, and FIG. 9 is a schematic drawing of part of a lidar system.

Referring to FIG. 1, there is shown a schematic functional drawing (not to scale) of a pulse compression radar system of the invention. The system incorporates an antenna 10 producing a radar beam 11 illuminating a landscape schematically indicated in one (range) dimension at 12. The landscape 12 is effectively shown as a sectional side elevation. It contains three major scattering objects 13, 14 and 15 in an area not greater than the classical Rayleigh resolution limit of the radar system. The objects, 13 to 15 appear in a clutter-generating background 16 of comparatively weak scatterers. The objects 13 to 15 generate return signals to the antenna 10 which are 18 dB stonger in intensity than clutter signals. The radar system has a 20 nanosecond pulse width, a 40 MHz bandwidth and a resolution limit of 5 meters. Each pixel of a corresponding radar display would normally be equivalent to 5 meters in range and in an orthogonal scan dimension. The outer objects 13 and 15 in the landscape 12 are 5 meters apart.

The antenna 10 is connected to a radar transmitter/receiver unit 20 and thence to a heterodyne signal processing (SP) unit 21 incorporating a local oscillator (not shown). The transmitter/receiver unit 20 and SP unit 21 are conventional radar apparatus and will not be described further. The SP unit 21 provides in-phase and quadrature or P and Q signals, ie complex image data, to a frame store 22 connected to a data select unit 23. P and Q signals pass from the data select unit 23 to an envelope detector 24 producing modulus values ($P^2+Q^2$), and thence to an image store 25 and display device 26.

The display device 26 comprises a 33×33 pixel (picture element) array, implying a time/bandwidth product of 33 for the radar system in two dimensions, range and bearing. Each pixel corresponds to a 1¼ meter resolution cell in the range and scan dimensions. This in fact corresponds to over-sampling of the image, since the fundamental or unenhanced resolution of the system is 5 meters. Normally, one pixel would be equivalent to one 5 meter resolution cell. It is portrayed thus for clarity of illustrating image enhancement in accordance with the invention. The objects 13 to 15 are imaged on the display device 26 as a single or unresolved diffraction lobe 27 extending across 6 pixels and surrounded by a speckle pattern of clutter features such as 28. The lobe 27 and features 28 are shown as two-dimensional contour plots. The width of the lobe 27 indicates the radar system diffraction limit.

Image modulus information also passes from the image store 25 to an intensity weight function generator 30, and thence to a computer 31 indicated by chain lines containing a flow diagram of operation. As will be described later in more detail, the computer 31 generates singular functions at 32 for subsequent image decomposition. It combines an amplitude weight function (based on the intensity weight function generated at 30) with the radar system impulse response stored at 33. The impulse response is the image the system produces of a point source or delta function. The singular functions are employed at 34 to decompose complex data, which is received directly from the frame store 22, in a similar fashion to spectral analysis into Fourier components. The image data become a linear combination of the singular functions with function coefficients calculated in the decomposition. Terms in this linear combination which are strongly affected by noise are removed at 35. The remaining terms are converted at 36 into an equivalent object decomposition. Object reconstruction is carried out at 37 to produce calculated P and Q values for each image pixel. This is similar to reconstitution of a signal from its Fourier spectral components. An envelope detector 38 generates the moduli of the P and Q values, which pass via an object store 39 to a second display device 40. The device 40 displays contour plots of three two-dimensional diffraction lobes 41 to 43. These correspond to super-resolved objects 13 to 15, and to the single unresolved diffraction lobe 27 or classical diffraction limit. The lobes 41 to 43 are accompanied by false images such as 44 arising from unusually intense clutter.

The object reconstruction or calculated P and Q values are also passed to an iteration controller 47, which also receives the original image data from the frame store 22. The controller 47 detects any change between the original image and the reconstructed object. If the change is significant, the controller 47 repeats the resolution enhancement procedure. To achieve this, a control signal is sent via a line 48 to the data select unit 23. The unit 23 then reads reconstructed object data from the iteration controller 47 via a line 49. The resolution enhancement process then proceeds once more using the reconstructed object data as input for both weight and singular function generation, and the original image data is decomposed once more. This iterative procedure continues by comparing each reconstructed object with that preceding. It terminates when the enhanced or reconstructed object does not change significantly between successive iterations.

Referring now to FIG. 2, there is shown a schematic functional diagram of the weight function generator 30 indicated within chain lines. Parts previously mentioned are like-referenced. As indicated at 50, pixel intensities or values of ($P^2+Q^2$) in successive image sub-areas up to 7×7 pixels in extent are addressed in the image store 25. Each sub-area has a central or equivalent pixel for which a weight is to be calculated on the basis of a statistical analysis of pixel intensities in the sub-area. Pixels near display edges having fewer than three pixels to one or two sides have respective weights calculated from all available pixels up to three pixels distant. This gives weight determination over a minimum of sixteen pixels for a corner pixel, and a maximum of forty-nine pixels for those spaced by at least three pixels from any display edge. At 51, the mean $<I(k)>$ and variance Var $[I(k)]$ of the respective sub-area pixel intensities $I(k)$ are calculated for all pixels in the sub-area, the parameter k indicating each individual pixel number. The results of these calculations are employed at 52 to derive $\alpha(k)$, a contrast coefficient term in the weight function (to be described later). They are also employed at 53 to set an adaptive threshold equal to $5<I(k)>$, ie the threshold is an intensity level equal to five times the mean intensity. At 54, each sub-area pixel intensity addressed is compared with the threshold $5<I(k)>$. Instensities below that threshold are treated as clutter signals or background, and those above as detected targets. Sub-threshold intensities are employed at 55 to calculate a background mean intensity for each sub-area ignoring above-threshold pixel intensities. The value of $\alpha$ and the background mean are used at 56 to generate a weight value for the central pixel of the respective sub-area, or that corresponding for sub-areas containing less than forty-nine pixels. This procedure is repeated until all pixels intensities in the display have a weight value. The weight values collectively form a weight function for singular function generation at 32 in the computer 31.

Referring now to FIG. 3, there is shown a schematic functional diagram of the iteration controller 47 indicated within chain lines. Parts previously mentioned are like-referenced. Object reconstruction data received by the controller 47 pass to a current object store 60, which simultaneously outputs any object data held from an immediately preceding iteration cycle to a preceding object store 61. The store 61 initially holds original image data received from the frame store 22. The contents of the current and preceding stores 60 and 61 are read via respective envelope detectors 62 and 63 to a difference calculator 64. The calculator 64 produces the squared sum of all individual pixel intensity changes over all 33×33 pixels, and divides this by the squared sum of all current pixel intensities. If the result is greater than $10^{-4}$, indicating an overall amplitude change >1%, a control signal is sent via line 48 to data select unit 23. The unit 23 then reads the contents of current object store 60 for subsequent envelope detection and generation of weight and singular functions. A further iteration or enhancement is then carried out upon the original image data. On receiving a second reconstructed data set, the current object store 60 passes the set received one iteration cycle earlier to the preceding object store 61, which ejects previously held data. Comparison between successive reconstructions then proceeds as before. Iteration cycling continues until successive object reconstructions differ by less than 1%, when display device 40 indicates a final reconstruction.

Referring now to FIG. 4, there are shown four two-dimensional displays in the form of contour graphs 71 to 74. These schematically represent 33×33 pixel radar displays such as 26 and 40 in FIG. 1, and each consists of amplitude modulus plotted in contours against range R and scan angle or bearing $\theta$. These graphs were obtained in a computer simulation of the invention. Graphs 71 and 72 are target and conventional radar image representations respectively, graph 73 is a weight function derived from the data of graph 72, and graph 74 is an object reconstruction. The scales are arbitrary, but the same for all four graphs. Range is derived from pulse time of flight and bearing from antenna position at signal receipt. Graph 71 is a two-dimensional point target represented at high resolution, and consists of a narrow central diffraction lobe 75. Graph 71 could theoretically be represented as a delta function one pixel in extent in range and bearing, but the narrow diffraction lobe 75 or target corresponds to more practical situations.

Graph 72 is a radar image of the target 75, and shows a broad central diffraction lobe 76 indicating the classical Rayleigh limit of diffraction. The lobe 76 is accompanied by a weak clutter background having features such as 77, 78 and 79. If no clutter were present, graph 72 would show only the central lobe 76 less its underlying background. The clutter-free lobe corresponds to the impulse response of the radar system in the range and bearing dimensions, impulse response being defined as the image produced by a point source. It is a calculable or measurable constant of an imaging system. For an optical system, the impulse response is commonly termed the optical transfer function. The corresponding one-dimensional impulse response would be sin x/x, where x is a variable appropriately normalised to the relevant pixel display. This impulse response would be appropriate for a radar system detecting target range on a fixed bearing.

The weight function shown in graph 73 is dominated by a main central lobe 80 corresponding to identification of a localised target, is target 75. In addition, small weight values 81, 82 and 83 correspond to clutter features incorrectly identified as weak targets. The weight function value is substantially constant other than at 80 to 83, as indated by the lack of contours. In the case of targets in a non-zero background, it would not be possible to distinguish between weak targets and clutter. The degree to which weak signals are given a significant weight value may be reduced by increasing the discrimination level, but at the expense of suppressing possible desired signals.

Graph 74 illustrates the effect of applying the weight function of graph 73 to image data. A well-resolved, main diffraction lobe 85 is shown having five contours, together with weak clutter-produced distortions 86 and 87 of one contour. Resolution is better than that obtainable according to the Rayleigh criterion. In addition, spurious targets 88, 89 and 90 appear weakly (one contour), and correspond respectively to small weight values 81 to 83. It is evident that a significant improvement in resolution has been obtained. This is indicated by comarison of the widths of the inner four contours of the main lobes 76 (image) and 85 (reconstructed object), and corresponds approximately to a factor of 2 improvement in resolution.

Whereas FIG. 4 illustrates a two-dimensional display, the invention is independent of the number of dimensions in which it is implemented. Versions of the invention may be used to enhance resolution in any one, two or all three of the range, bearing and elevation dimensions. Appropriately dimensional singular functions, weight functions and impulse responses would be employed.

Referring now to FIG. 5, there are shown two computer-simulated graphs 101 and 102 corresponding respectively to a scene and a conventional radar image of that scene. The graphs are the equivalent of graphs 71 and 72 in FIG. 4 for a different scene. Graph 101 displays four relatively intense point targets 103 to 106 (cf 75), each having five contours. The targets 103 to 106 appear within a comparatively weak clutter or speckle background indicated generally by 107 and consisting largely of one-contour features. The radar image of graph 102 indicates that the targets 103 to 106 have not been resolved. They are reproduced as a single broad diffraction lobe 108 of five contours, of which the lowest contour 109 is dominated by the effects of clutter. Lobe 108 has a peak value 18 dB in intensity above mean clutter intensity. One and two-contour clutter features accompany the main lobe 108, some of which are indicated by 110 and 111 respectively.

Referring now to FIG. 6, there are shown the first sixteen object space singular functions derived from imaging system impulse response and a uniform weight function. The functions are illustrated as two-dimensional contour plots 121 to 136. These functions are shown for the purposes of comparison with those obtained in accordance with the invention, ie when a weight function generator such as 30 is employed to generate a non-uniform weight function from image data. If the singular functions 121 to 136 were to be employed to reconstruct an object from the image data represented by graph 102, reconstruction would give no resolution improvement whatsoever. The image would be left unchanged apart from minor computational rounding or digitisation errors. This corresponds to the conventional imaging process.

Referring now to FIG. 7, there are shown the first sixteen object space singular functions 141 to 156 derived from system impulse response and a non-uniform weight function produced in accordance with the invention as indicated at 30. Image space singular functions are not shown. It can be seen from graphs 141 to 147 in particular that a major effect of introducing a non-uniform weight is to concentrate function magnitude in central graph regions. This corresponds to the positions of targets 103 to 106 and image diffraction lobe 108 in FIG. 5.

Turning now to FIG. 8, object reconstruction is illustrated using the functions 141 to 156 of FIG. 7. FIG. 8 shows four graphs 161 to 164 corresponding respectively to one, two, three and four iterations of the reconstruction process, ie applying recomputed singular functions to the original image 102 of FIG. 5. It can be shown that the main diffraction lobe 108 of image 102 is very largely composed of a linear combination of lower-order functions 141 to 147 together with 149 and 150. Unsuppressed clutter background 110 and 111 is largely reconstructed from higher order functions 148 and 151 to 156.

Comparing object reconstruction in FIG. 8 with original image 102, it is seen that one application of the reconstruction procedure shown in graph 161 has improved resolution appreciably. In particular, three maxima 165 have been resolved from the four (103 to 106) originally present but unresolved at 108. Graphs 162 to 164 give the effect of successive iterations of the reconstruction process. The net effect in graph 164 is that the four original targets 103 to 106 are resolved with varying degrees of strength at 166 to 169. A fifth and spurious peak 170 indicates a false target close to the original targets. In addition, a further target is strongly indicated at 171, although this is also spurious. Minor clutter features are reproduced at positions such as 172. It can be seen that the overall effect of the reconstruction process is to produce greatly enhanced resolution at the small expense of introducing a minor amount of spurious information. A radar operator viewing the initial image and final reconstruction has the option of disregarding peaks not corresponding to major features of the original image. The great improvement obtained in accordance with the invention is that diffraction lobes such as 108 are resolved as arising from several small features of a scene, rather than from one large feature as in the prior art. This would permit for example an operator to distinguish the presence of vehicles in a scene containing larger objects.

The process of target or object reconstruction by singular function decomposition will now be described in more detail. Initially, the generation of an intensity weight function W having individual values W(k) will be described. The index k corresponds to pixel number, and may have x and y components $k_x$, $k_y$, or may be a single index if pixels are labelled serially, ie either 1 to 33 for both x and y components or 1 to 1089 for a single index.

A physical object in a real scene is imaged as a bright object superimposed on a clutter background. The intensity distribution of the clutter background arises from interference between a large number of random scatters, and gives rise to the speckle phenomena. It is well described by an uncorrelated Gaussian probability distribution as follows:

$$P(I) = \frac{1}{<I>} \exp[-I|<I>] \qquad (1)$$

where P(I) is the probability of a pixel exhibiting intensity I, and $<I>$ is the mean of all pixel intensities.

It follows from Equation (1) that the relative variance Var(I) of pixel intensity fluctuations for clutter is given by:

$$Var(I)/<I>^2 = 1 \qquad (2)$$

For an N-look radar, the equivalent relative variance would be given by $$Var(I)/<I>^2 = 1/N \qquad (3)$$

To compute a weight value for each individual pixel, its intensity is compared with those of nearby pixels. The approach is to determine whether the pixel intensity is comparable with or significantly above the average of its respective nearby pixels. Pixel intensities significantly above an average of nearby pixel intensities are assigned an intensity-dependent weight. Those not differing significantly from this average are accorded a weight which is an average over nearby pixel intensities also classified as background, ie an average over pixels other than those which are significantly intense.

The statistical properties of bright scattering objects in a scene are not known. Accordingly, the procedure is to treat them as having similar properties to those of clutter, ie an uncorrelated Gaussian distribution.

As previously indicated, each pixel of an image is assigned an intensity weight value W(k) calculated by comparing its intensity with that of nearby pixels. Pixel intensities in the respective 7×7 image pixel sub-area for each pixel is addressed at 50 from the image store 25 for the intensity comparison. The equivalent smaller sub-area previously mentioned is similarly employed for near-edge pixels. The sub-area or local mean $<I(k)>_A$ and variance $\text{Var}[I(k)]$, ie $<I(k)>_A^2$, of the sub-area pixel intensities are calculated at 51 for each pixel number k on the basis of its respective sub-area or local pixel intensities.

To suppress the clutter background, any pixel intensity I(k) not greater than a threshold of five times its respective mean local sub-area intensity, ie $5<I(k)>_A$, is treated as clutter. It is assigned an intensity weight value W(k) equal to the respective local means background intensity. ie $$W(k) = <I(k)>_B, \quad I(k) \leq 5<I(k)>_A \tag{4}$$

where $<I(k)>_B$ is the mean intensity of those pixels in the respective sub-area which do not exceed the local threshold $5<I(k)>_A$. The threshold is calculated at 53 from the sub-area mean $<I(k)>_A$ generated at 51. Sub-area pixel intensities addressed at 50 are compared with the threshold by the threshold detector 54. All pixel intensities not greater than the threshold are employed at 55 to generate the local mean background intensity $<I(k)>_B$.

Any pixel intensity I(k) which exceeds its respective local threshold is assigned an intensity dependent weight value W(k). This value is equal to the respective background mean value of $<I(k)>_B$ plus a contrast term varying in accordance with the relative prominence of the respective pixel intensity. ie $$W(k) = <I(k)>_B + \alpha(k)(I(k) - <I(k)>_B) \tag{5}$$

where $$\alpha(k) = \frac{\beta - 1}{\beta + 1}, \quad \beta = \frac{\text{Var}[I(k)]}{<I(k)>_A^2} \tag{6}$$

The threshold detector 54 supplies a control signal to the unit 52 calculating $\alpha(k)$ from the respective local mean intensity. If the pixel intensity I(k) is not greater than the local theshold, the control signal is employed to set the output value of $\alpha(k)$ to zero irrespective of its calculated value. Otherwise, $\alpha(k)$ is calculated as indicated in Equation (6). The intensity weight value W(k) is then calculated from Equation (5) as indicated at 56.

This procedure is repeated until all pixels have been assigned a respective weight value, and the resulting set of values constitutes the intensity weight function W.

It should be noted that the foregoing weight generation procedure automatically deals adaptively with a background which is not constant. Each pixel weight W(k) is calculated from its respective sub-area, and the background term $<I(k)>_B$ in Equation (5) accordingly varies from pixel to pixel.

Turning now to the process of target or object reconstruction by singular value decomposition, let $\psi$ be an orthonormal set of functions in image space into which an image may be decomposed.

Then $$\psi_i^\dagger \psi_j = \delta_{ij} \begin{pmatrix} = 1, i = j \\ = 0, i \neq j \end{pmatrix} \tag{7}$$

where $\psi_i^+$ is the Hermitian conjugate of $\psi_1$.

Let the object states be described by a set of weighted functions $\xi$, which functions are equal to the product of an amplitude weighting function w and unweighted functions 100 $j$. The amplitude weighting function w is related to the intensity weighting function W previously defined by the expression:

$$W = |w|^2 \tag{8}$$

Since W is real, $$w = \sqrt{w} \tag{9}$$

Then $$\xi_j = w\phi_j \tag{10}$$

Let T be the impulse response of the imaging system, ie the image the system generates of an object having the dimensional properties of a delta function. For a lens, this would be the image of a geometrical point source, the optical transfer function having two spatial dimensions. Reference 1 gives impulse response functions for square and circular lenses. A radar system impulse response has one temporal (range) dimension if fixed, and one temporal and one or two spatial dimensions if scanned. A rotating radar scanner has an angular spatial dimension and a synthetic aperture radar a linear spatial dimension. Impulse responses of this kind may be calculated and/or measured in individual imaging systems by known techniques. Necessarily, the object space functions must be imaged into image space functions by the imaging system transformation or impulse response T. Accordingly, from Equation (10):

$$\psi_j = T\xi_j = Tw\phi_j \tag{11.1}$$

and $$\psi_i^+ = \phi_i^+ w^+ T^+ \tag{11.2}$$

Combining Equations (11.1), (11.2) and (7):

$$\phi_i^+ w^+ T^+ Tw\phi_j = \delta_{ij} \tag{12}$$

The expression $w^+T^+Tw$ in Equation (12) is an operator having eigenstates or eigenfunctions which are the unweighted object space function set $\phi$, and eigenvalues which may be denoted by $\lambda_j$. Solving Equation (12) for $\phi_j$ gives the eigenfunction equation:

$$w^+T^+Tw\phi_j = \lambda_j\phi_j \tag{13}$$

Equation (13) determines the unweighted object space function set as eigenstates of the object space operator $w^+T^+Tw$. The $\phi$ function set can accordingly be calculated by the computer 31 from the amplitude weight function w and the impulse response T of the imaging system. T is known, and w is derived from Equation (9) at 32. Combining Equations (12) and (13):

$$\phi_i^+ \phi_j = \frac{1}{\lambda_j} \phi_i w^+ T^+ Tw\phi_j = \frac{\delta_{ij}}{\lambda_j} \tag{14}$$

Equation (14) demonstrates that the function set $\phi$ is an orthogonal set, and that the functions $\psi$ and $\phi$ are uniquely related orthogonal sets, the relationship being defined by the normalisation coefficient or energy term $\lambda_j$. If desired, the function set $\phi$ could be normalised by multiplying by $\sqrt{\lambda_i}$ to produce an orthonormal set, say $\bar{\phi}$, where $\bar{\phi}_i = \sqrt{\lambda_i}\phi_i$. This is not however essential.

To obtain the image space function set $\psi$, a further eigenfunction equation is set up by substituting $\psi_j = Tw\phi_j$ from Equation (11) in the left hand side of Equation (13): ie $$w^+ T^+ \psi_j = \lambda_j \phi_j \tag{15}$$

Multiplying both sides of Equation (15) by Tw:

$$Tww^+ T^+ \psi_j = \lambda_j Tw\phi_j \tag{16}$$

Substituting $\psi_j = Tw\phi_j$ in the right hand side of Equation (16):

$$Tww^+ T^+ \psi_j = \lambda_j \psi_j \tag{17}$$

Equation (17) determines the image space function set $\psi$ as eigenstates of the image space operator $Tww^+T^+$, the eigenvalues $\lambda_j$ being identical to those of the object space. The function set $\psi$ and the eigenvalue set $\lambda$ can accordingly be calculated by the computer 31 from $w$ and $T$ as for Equation (13).

Complex image data is represented by a set $g$ having individual pixel values $g(k)$, where $k$ represents pixel number as before. Decomposition of the set $g$ into a function set $\psi$ is defined by:

$$\psi_i^+ g = \sum_k \psi_i^+(k) g(k) \tag{18}$$

ie the proportion or fraction $\psi_i^+ g$ of the image data set $g$ present in the ith image space singular function $\psi_i^+$ is the summation over all k of the product of the kth point value of $\psi_i$ and the kth value of $g$. This calculation is carried out for the whole of the image space function set, $\psi$, ie $\psi_1$ to $\psi_n$, so that image data is decomposed to a series of numerical coefficients of the kind $\psi_i^+ g$ each multiplying a respective function $\psi_i$. This is analogous to decomposition of a signal into its Fourier components.

If i suffixes replace j suffixes in Equation (11.1) and both sides are multiplied by $$\frac{1}{\lambda_i} ww^+ T^+ :$$

Then $$\frac{1}{\lambda_i} ww^+ T^+ \psi_i = \frac{1}{\lambda_i} ww^+ T^+ Tw\phi_i \tag{19}$$

Substituting $w^+ T^+ Tw\phi_i = \lambda_i \phi_i$ (from Equation (13) with suffix change) in the right hand side of Equation (19) and putting $\xi_i = w\phi_i$ from Equation (10):

$$\frac{1}{\lambda_i} ww^+ T^+ \psi_i = \frac{1}{\lambda_i} w\lambda_i \phi_i = w\phi_i = \xi_i \tag{20}$$

Equation (20) demonstrates that the ith weighted object space function is precisely equivalent to the term $$\frac{1}{\lambda_i} ww^+ T^+ \psi_i.$$

Moreover, a reconstruction $f_r$ of an object $f$ from a decomposition in terms of a function set $\psi$ is defined mathematically by:

$$f_r = \sum_i \frac{1}{\lambda_i} ww^+ T^+ \psi_i g_i \tag{21}$$

where $\tilde{g}_i = \psi_i^+ g =$ that fraction of the image appearing in the ith function $\psi_i$, which was determined in image decomposition using Equation (18).

Combining Equations (20) and (21):

$$f_r = \sum_i \xi_i \tilde{g}_i \tag{22}$$

Equation (22) demonstrates that object reconstruction is achieved by multiplying the ith weighted object space singular function $\xi_i$ by the ith coefficient $\tilde{g}_i$ of, or fraction of the image in, the corresponding ith image space singular function $\psi_i$, and then summing the result over all i eigenstates. Individual complex reconstructed object amplitudes or P and Q values are given by $f_r(k)$ for the kth pixel, where:

$$f_r(k) = \sum_i \xi_i(k) \tilde{g}_i \tag{23}$$

ie The kth pixel complex amplitude is the sum of all k-point values of the term $\xi_i \tilde{g}_i$.

The reconstruction expressed by Equations (22) and (23) is valid provided that total noise N introduced by the imaging system is negligible compared to clutter background intensity, and provided that Nyquist image sampling is employed. This is in fact the case for all radars viewing landscape scenes consisting of targets in a clutter background. However, imaging systems may be employed in situations where noise significantly affects image data. Moreover, the image energy $\lambda_i$ contributed by the ith image state singular function $\psi_i$ falls with increasing i, ie higher order functions contribute less image energy. If at some i $\psi_i$ falls to equality with or below a corresponding fraction $N_i$ or contribution of total system noise energy N, then both that and higher order terms should be omitted from the decomposition/reconstruction process. For white noise, the fraction of system noise $N_i$ contributed by the ith function $\psi_i$ is a constant for all i, and is equal to N/M, where M is the total number of singular functions in set $\psi$ or $\phi$. Accordingly, the summation in Equation (22) and (23) is terminated at $i_{max}$, where $\lambda_{i\ max}$ is the highest order eigenvalue for which $\lambda_i > N/M$ holds goods. The reconstruction Equation (23) may then be written more fully as:

$$f_r(k) = \sum_{i=1}^{i_{max}} \xi_i(k) \tilde{g}_i \tag{24}$$

It is observed that truncation of the $f_r(k)$ summation does not greatly affect resolution. Inclusion of a term incorporating a significant proportion of noise may however severely affect reconstruction. The effect of each term is inversely proportional to the respective $\lambda_1$, so terms with small and noise-affected values of $\lambda_i$ may produce disproportionately deleterious results.

It is however a major advantage of the present invention that noise is not so important a consideration as in References 1 and 2. In these References, if truncation is not carried out, the reconstructed object changes dramatically and spuriously as soon as a noise-corrupted term is added. In the present invention, noise-corrupted image data are treated and processed as background clutter, and both have Gaussian statistics. Accordingly, the effect of retaining noise-corrupted terms is merely to include noise "clutter" with background clutter. This only worsens the contrast between identified targets and background. In other words, the reconstruction degrades gracefully with increasing noise in the present invention, and reconstruction truncation is advantageous but not essential.

To summarise the computation, the weight function generator 30 calculates an intensity weight function W from image intensity statistics. The computer 31 calculates the object and image space function sets $\phi$ and $\psi$ at 32 from the eigenvalue Equations (13) and (17) incorporating the known system impulse response T stored at 33 and the amplitude weight function w derived from W. It then computes the weighted object space function set from the Equation (10) definition. The image data set g is then decomposed at 34 into a linear combination of the function set $\psi$ using Equation (18). This yields coefficients $\psi_i \div g$ or $\bar{g}_i$ which are precisely the same as those appearing in the object decomposition in terms of the function set $\xi$. Each value of $\lambda_i$ is then compared at 35 with the fraction N/M of imaging system noise, and all functions and coefficients for which the corresponding $\lambda_i \not> N/M$ are discarded. The computer 31 multiplies each remaining function $\xi_i$ by the respective coefficient $\bar{g}_i$ producing the object decomposition in terms of $\xi$ at 36, and then at 37 computes the contribution $g_i\xi_i(k)$ to the complex amplitude of pixel number k. The contributions $g_1\xi_1(k)$ are then summed over all i at each pixel in turn to produce the required reconstructed object data set, in a complex data value or P and Q for each pixel. This is analogous to reconstructing a signal from its Fourier spectral components by adding together the contributions from each component to the corresponding points of the signal. After envelope detection at 38 to produce amplitude moduli $\sqrt{(P^2+Q^2)}$, the reconstructed object data pass to the object store 39 for display at 40.

The foregoing computation produces a single stage or iteration of resolution enchancement, as illustrated in FIG. 4 in which image data in graph 72 is enhanced to a reconstruction shown in graph 74. As previously outlined, the computation is iterated by means of the iteration controller 47 to obtain any significant further enhancement as follows. The difference calculator 64 receives a respective stream of pixel amplitude modulus values, $\sqrt{(P^2+Q^2)}$, from each of the envelope detectors 62 and 63. These streams correspond to the first reconstruction and original image (first cycle) or to successive reconstructions (later cycles). If the complex amplitude of the kth pixel after the nth iteration cycle is defined as $f_r^n(k)$, then current object store 60 holds all $f_r^n(k)$ and preceding object store 61 all $f_r^{n-1}(k)$. For n=1, $f_r^0(k)$ is the original image information received from frame store 22. The difference calculator 64 receives modulus values $|f_r^n(k)|$ and $|f_r^{n-1}(k)|$ from envelope detectors 62 and 63. It computes the difference between successive intensities of each pixel, then squares and sums the differences over all pixels. The result is divided by the squared sum of reconstructed pixel intensities to produce a ratio R. This is expressed by:

$$R = \frac{\sum_k [|f_r^n(k)|^2 - |f_r^{n-1}(k)|^2]^2}{\left[\sum_k |f_r^n(k)|^2\right]^2} \quad (25)$$

If R is greater than $10^{-4}$, the nth iteration has produced an overall intensity variation of more than 1%. A further iteration is carried out as previously indicated, using the $f_r^n(k)$ complex amplitude values as input to envelope detector 22. If R is less than $10^{-4}$, iteration is terminated. A different criterion or R value for iteration termination could of course be chosen.

The apparatus illustrated in schematically FIGS. 1, 2 and 3 has been described in functional terms. However, implementation of the apparatus is a straightforward matter for those skilled in the art of digital electronics and computer programming. There are in fact various options for implementing the invention. The procedures of weight generation and iteration control could be carried out employing a computer of sufficient capacity to execute these as well as singular function decomposition. This corresponds to modifying FIG. 1 so that the computer 31 includes the weight function generator 30 and iteration controller 47. This may however be comparatively slow in operation. The generator 30 would preferably be implemented as a dedicated arithmetic unit arranged to execute the required calculations. This requires an address unit 50 to address pixel sub-area intensities, together with an arithmetic unit or arrangement of full adders at 51 to perform the necessary repeated addition/subtraction for multiplication/division to generate $<I(k)>_A$ and $\alpha(k)$. The adaptive threshold set at 53 is performed by a simple multiplier to provide $5<I(k)>_A$. Threshold detector 54 contains a comparator to compare I(k) and $5<I(k)>_A$. Values of I(k) above $5<I(k)>_A$ are routed to 55 for addition by a full adder, and means for counting their total number is provided. $<I(K)>_B$ is simply their sum divided by their number, and division is performed by the same or a further full adder arranged for repeated twos complement addition, ie well-known digital division. Weight function generation at 56 requires a full adder for adding the twos complement of $<I(k)>_B$ to I(k). Subsequently, this or as convenient a further full adder performs the repeated addition necessary to evaluate $\alpha(k)(I(k)-<I(k)>_B)$, and the sum (Equation (5)) $<I(k)>_B + \alpha(k)(I(k)-<I(k)>_B)$ is calculated to provide W(k). This could be executed rapidly with a dedicated arithmetic unit.

Similarly, the iteration controller 47 may be implemented as a dedicated hardware unit. The stores 60 and 61 together with envelope detectors 62 and 63 are well-known devices. The difference calculator 64 may be implemented with an appropriate full adder arrangement, and the threshold detector 65 would be a simple comparator. The choice of hardware or software implementation is accordingly a matter of engineering convenience and operating speed requirements to be resolved by those skilled in the art of digital electronics and computer software. In this respect the operational equivalence of electronic hardware and computer software is very well known. Similar considerations apply to stores 22, 25 and 38, envelope detectors 24 and 38 together with data select unit 23 as regards their location within or implementation apart from computing means.

Referring now to FIG. 9, there is shown a schematic drawing of part of a lesser ranging or lidar system. The system comprises a continuous wave (cw) $CO_2$ laser 180 producing a plane polarised output light beam along a path 181 to a first beam splitter 182. Light transmitted by the beam splitter 182 passes via a second beam splitter 183 to a $CO_2$ laser amplifier 184 arranged to produce 10 nsec pulses at a repetition frequency of 10 kHz. A first lens 185 renders the amplifier output beam 186 parallel for illumination of a scattering object 187 in a remote scene (not shown). Light scattered from the object 187 is focussed by a second lens 188 on to two detectors 189 and 190. Detector 189 receives a reference light beam 191 from the laser 180 after reflection at the beam splitter 182 and at a partially reflecting mirror 192. In addition, the detector 189 receives light scattered from the object 187 after transmission through a partially reflecting mirror 193 and through the partially reflecting mirror 182 via a path 194. Detector 190 receives a reference beam 195 from reflection of laser light 181 at the beam splitter 183 with subsequent transmission via a $\pi/2$ or quarter wavelength delay device 196 and reflection at a partially reflecting mirror 197. Light scattered from the object 187 and reflected at the mirror passes via paths 198 and 199 to the detector 190 after reflection at a mirror 200 and transmission through the partially reflecting mirror 197. The delay device 196 may be a gas cell having an optical thickness appropriate to delay the beam 195 by $(n+\frac{1}{4})$ wavelengths, n being integral but arbitrary. The gas pressure in the cell would be adjusted to produce the correct delay by known interferometric techniques; ie the device 196 would be placed in one arm of an interferometer and the gas pressure varied until fringe pattern movement indicated the correct delay.

The arrangement of FIG. 9 operates as follows. The delay unit 196 introduces a $\pi/2$ phase shift in the reference beam 195 reaching detector 190 as compared to that reaching detector 189. Each of the detectors 189 and 190 mixes its reference beam 191 or 195 with light 194 or 199 from the scene, acting as a homodyne reciver. The laser 180 acts as its own local oscillator. In view of the $\pi/2$ phase difference between the reference beams 191 and 195, detectors outputs with a relative phase difference of $\pi/2$ are produced at 201 and 202. These outputs accordingly provide in-phase and quadrature signals P and Q, or complex amplitude image data. These signals are precisely analogous to the P and Q signals appearing at the output of the signal processing unit 21 in FIG. 1, and are processed in the same way as previously described to provide resolution enhancement.

In an analogous fashion, a sonar system may be adapted for resolution enhancement in accordance with the invention, since P and Q signals are provided by sonar transducer array processors which may be analysed in the same way as radar or lidar signals. Moreover, a sonar transducer is both a transmitter and a receiver, so a transducer array provides equal numbers of transmitters and receivers for which the present invention is entirely suitable.

Whereas the foregoing description (with reference to FIG. 1 in particular) has referred to calculation of object and image space singular functions from the weight function and system impulse response, in some cases this is capable of simplification. As indicated in FIG. 4, graph 73, the weight function may consist of a constant background containing a main lobe of approximately Gaussian profile. Sets of Gaussian profiles of varying heights and widths may be stored, together with corresponding object and image space singular function sets. This is valid since the system impulse response is a constant, and the function sets vary only with the weight function. Accordingly, rather than calculating the singular functions during image analysis, they would be precalculated from the Gaussian profile weight functions and impulse response. Generation of singular functions then reduces to matching the measured weight function as nearly as possible to a Gaussian profile, and selecting corresponding stored singular functions. The number of possible approximate weight functions is limited, so that the storage of singular functions need not be impracticable. The weight function matching process may be achieved by well-known correlation techniques. This procedure should reduce computer time needed for image processing, but at the expense of increasing memory requirements.

We claim:

1. An imaging system having a given impulse response and including:
    (1) an imaging device employing coherent radiation and arranged to provide complex amplitude image data,
    (2) means for generating from image data a weight function appropriate to distinguish weak and strong image features,
    (3) means for reconstructing object data from a singular function decomposition of image data on the basis of singular functions derived from the weight function and system impulse response, and
    (4) means for generating an image from reconstructed object data.

2. An imaging system according to claim 1 wherein the means for reconstructing object data comprises computing means arranged to:
    (1) provide image and object space singular functions from the weight function and system impulse response,
    (2) decompose image data into a linear combination of image space singular functions,
    (3) convert the image space singular function combination into a corresponding object decomposition, and
    (4) reconstruct object data from its decomposition.

3. An imaging system according to claim 2 wherein the computing means is arranged to omit noise-corrupted singular functions from the object reconstruction.

4. An imaging system according to claim 2 wherein the computing means is arranged to compare generated functions with stored weight functions associated with corresponding singular functions for provision for image decomposition and object reconstruction.

5. An imaging system according to claim 1 wherein the means for generating a weight function is arranged to assign each image pixel intensity a weight value derived from comparison with respective local pixel intensities.

6. An imaging system according to claim 5 wherein the weight value comprises the sum of a local background intensity term and a contrast term.

7. An imaging system according to claim 6 wherein the contrast term is non-zero provided that the relevant pixel intensity exceeds a given multiple of a corresponding average over local pixel intensities.

8. An imaging system according to claim 1 including means for iterating object reconstruction, which means is arranged to be operative until resolution enhancement becomes insignificant.

* * * * *

UNITED STATES PATENT AND TRADEMARK OFFICE
CERTIFICATE OF CORRECTION

PATENT NO. : 4,716,414

DATED : December 29, 1987

INVENTOR(S) : Stephen P. Luttrell and Christopher J. Oliver

It is certified that error appears in the above-indentified patent and that said Letters Patent is hereby corrected as shown below:

The title page should be deleted to be replaced with the attached title page.

United States Patent [19]
Luttrell et al.

[11] Patent Number: 4,716,414
[45] Date of Patent: Dec. 29, 1987

[54] SUPER RESOLUTION IMAGING SYSTEM

[75] Inventors: Stephen P. Luttrell, Malvern Wells; Christopher J. Oliver, Malvern, both of England

[73] Assignee: The Secretary of State for Defence in Her Britannic Majesty's Government of the United Kingdom of Great Britain and Northern Ireland, London, England

[21] Appl. No.: 784,665

[22] Filed: Apr. 30, 1985

[30] Foreign Application Priority Data

May 10, 1984 [GB] United Kingdom ............ 8411916

[51] Int. Cl.⁴ .................................... G01S 13/89
[52] U.S. Cl. ................................ 342/179; 367/7; 356/4.5
[58] Field of Search ............ 342/179; 367/7, 11; 73/602, 606; 350/3.66; 356/347, 349, 4.5; 256/330, 334

[56] References Cited
U.S. PATENT DOCUMENTS
3,953,822  4/1976  Vilkomerson ............... 342/179 X

OTHER PUBLICATIONS
Nakayama et al., "Imaging by Means of Multifrequency Hologram Matrix", Electronics and Communications in Japan, vol. 62-B, No. 12, 1979.

*Primary Examiner*—T. H. Tubbesing
*Assistant Examiner*—Gilberto Barrón, Jr.
*Attorney, Agent, or Firm*—William R. Hinds

[57] ABSTRACT

A super resolution imaging system employing coherent radiation comprises transmitting, receiving and processing means to provide complex amplitude image data. The image data is processed by a weight function generator to provide a weight function. The weight function has values at individual image pixels consisting of a background or clutter intensity term added to a pixel intensity dependent term. The latter term is non-zero for pixel intensities exceeding a threshold level well above background. A computer generates singular functions from the weight function and system impulse response, and employs the singular functions to decompose the image data and subsequent object reconstruction. This provides enhanced resolution compared to that available from the image data alone. An iteration controller employs the reconstructed object data to iterate resolution enhancement until no significant improvement is obtained.

8 Claims, 9 Drawing Figures

UNITED STATES PATENT AND TRADEMARK OFFICE
CERTIFICATE OF CORRECTION

PATENT NO. : 4,716,414

DATED : December 29, 1987

INVENTOR(S) : Stephen P. Luttrell, Christopher J. Oliver

It is certified that error appears in the above-indentified patent and that said Letters Patent is hereby corrected as shown below:

The sheet of drawing, consisting of Fig. 1, should be deleted to be replaced with the drawing sheet consisting of Figure 1, as shown on the attached page.

Signed and Sealed this

Nineteenth Day of April, 1994

Attest:

BRUCE LEHMAN

*Attesting Officer*  Commissioner of Patents and Trademarks

UNITED STATES PATENT AND TRADEMARK OFFICE
CERTIFICATE OF CORRECTION

PATENT NO. : 4,716,414                    Page 4 of 4

DATED     : December 29,, 1987

INVENTOR(S) : Stephen P, Luttrell, Christopher J. Oliver

It is certified that error appears in the above-indentified patent and that said Letters Patent is hereby corrected as shown below:

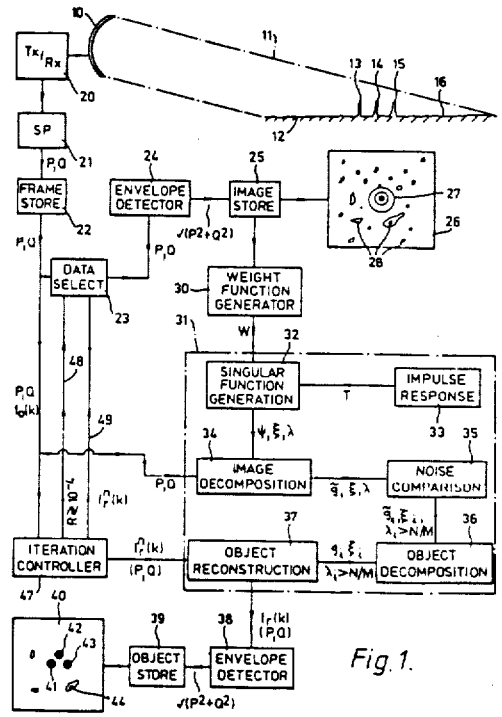

Fig. 1.